UNITED STATES PATENT OFFICE.

WILHELM BERGDOLT, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

DIAZOTIZABLE COLORING-MATTER.

1,052,647.  Specification of Letters Patent.  Patented Feb. 11, 1913.

No Drawing.  Application filed June 19, 1912.  Serial No. 704,569.

*To all whom it may concern:*

Be it known that I, WILHELM BERGDOLT, doctor of philosophy, chemist, citizen of the German Empire, residing at Leverkusen, near Cologne, Germany, have invented new and useful Improvements in Diazotizable Coloring-Matter, of which the following is a specification.

I have found that new and valuable diazotizable trisazo dyestuffs can be obtained by saponifying the acylaminoazo compounds obtained from 1 molecule of a diazotized monoacyl-meta-phenylenediamin and 1 molecule of meta-phenylene- or meta-toluylenediamin-sulfonic acid, tetrazotizing the products thus obtained and combining them with 2 molecules of meta-phenylene- or meta-toluylenediamin. When dyed on cotton they can be diazotized on the fiber in the usual way and developed with beta-naphthol resulting in pure brown shades of great fastness to washing.

The new dyes are after being dried and pulverized in the shape of their alkaline salts dark powders soluble in water generally with a yellow to red coloration. Upon reduction with stannous chlorid and hydrochloric acid they are split up into meta-phenylenediamin a triaminobenzene-sulfonic acid and a triamin of the benzene series.

In order to illustrate the new process more fully the following example is given, the parts being by weight:—13.6 parts of meta-aminoformylanilid are diazotized in the presence of 30 parts of hydrochloric acid (19.5° Bé.) with 6.9 parts of sodium nitrite, the temperature being kept at about 0° C. and coupled with 23 parts of toluylenediamin-sulfonate of soda $$(CH_3 : NH_2 : NH_2 : SO_3H = 1 : 2 : 6 : 4)$$

dissolved in soda solution. After the formyl group has been eliminated by boiling the product with an acid or with a caustic alkali the product is tetrazotized and coupled with 22 parts of meta-phenylenediamin in soda solution. The dyestuff is salted out with common salt, pressed and dried. It is a dark powder soluble in water with a yellowish-red coloration, soluble in concentrated sulfuric acid with a brown coloration; yielding upon reduction with stannous chlorid and hydrochloric acid meta-phenylenediamin, triaminotoluene-sulfonic acid and triaminobenzene.

The formula of the dyestuff is graphically represented as follows:

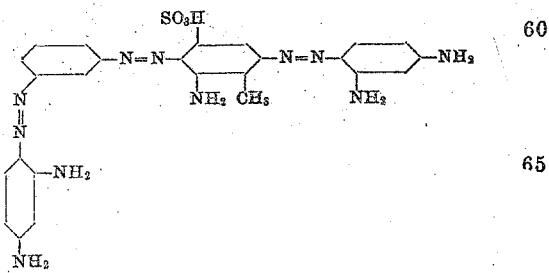

Instead of meta-toluylenediamin-sulfonic acid meta-phenylenediamin-sulfonic acid and instead of meta-phenylenediamin meta-toluylenediamin can be used.

I claim:—

1. The herein described new diazotizable trisazo dyestuffs which are after being dried and pulverized in the shape of their alkaline salts dark powders soluble in water generally with a yellow to red coloration; yielding upon reduction with stannous chlorid and hydrochloric acid meta-phenylenediamin, a triaminobenzene-sulfonic acid and a triamin of the benzene series, which dyes can be diazotized on the fiber and developed with beta-naphthol resulting in pure brown shades of great fastness to washing, substantially as described.

2. The herein described new diazotizable trisazo dyestuff which is after being dried and pulverized in the shape of its alkaline salt a dark powder soluble in water with a yellowish-red and soluble in concentrated sulfuric acid with a brown coloration; yielding upon reduction with stannous chlorid and hydrochloric acid meta-phenylenediamin, triaminotoluene-sulfonic acid and triaminobenzene, which dye can be diazotized on the fiber and developed with beta-naphthol resulting in pure brown shades of great fastness to washing, substantially as described.

In testimony whereof I have hereunto set my hand in the presence of two subscribing witnesses.

WILHELM BERGDOLT. [L. s.]

Witnesses:
 HELEN NUFER,
 ALBERT NUFER.